United States Patent [19]

Price

[11] Patent Number: 4,830,093

[45] Date of Patent: May 16, 1989

[54] METHOD AND APPARATUS FOR UTILIZING WASTE HEAT IN A COMBUSTION SYSTEM

[76] Inventor: Richard C. Price, 9816 Frankstown Rd., Pittsburgh, Pa. 15235

[21] Appl. No.: 946,974

[22] Filed: Dec. 29, 1986

[51] Int. Cl.$^4$ .................. F28D 15/00; F27D 17/00; F27B 1/22

[52] U.S. Cl. .................................. 165/1; 165/18; 165/104.31; 165/909; 266/141; 266/155; 122/20 B; 432/30

[58] Field of Search .................. 165/909, 18, 104.31, 165/1; 266/139, 141, 155; 122/35, 20 B; 432/30, 40

[56] References Cited

U.S. PATENT DOCUMENTS

| | | | |
|---|---|---|---|
| 1,833,130 | 11/1931 | Roe | 266/155 |
| 3,523,575 | 8/1970 | Olivieri | 165/18 |
| 4,044,820 | 8/1977 | Nobles | 165/909 |
| 4,071,075 | 1/1978 | Hinkle | 165/104.31 |
| 4,137,965 | 2/1979 | Fallon, Jr. et al. | 165/909 |
| 4,257,579 | 3/1981 | Bruhn et al. | 165/909 |
| 4,340,207 | 7/1982 | Bruhn et al. | 165/909 |
| 4,344,568 | 8/1982 | Stewart et al. | 165/909 |
| 4,452,586 | 6/1984 | Voges | 165/909 |
| 4,628,869 | 12/1986 | Symsek et al. | 122/20 B |
| 4,655,436 | 4/1987 | Williams | 266/155 |

Primary Examiner—Albert W. Davis, Jr.
Assistant Examiner—John K. Ford
Attorney, Agent, or Firm—Buchanan Ingersoll; Michael L. Dever

[57] ABSTRACT

An improved method and apparatus for recovery of waste heat of the type having a first heat exchanger which transfers heat to a working fluid and a second heat exchanger which transfers heat from the working fluid is disclosed. The improvement comprises the provision of at least one storage tank for the working fluid having a volume calculated by the flow rate of the working fluid multiplied by a time difference between the time in which the combusiton chamber has its peak fuel requirement and a next subsequent time at which a maximum amount of waste heat is available to the combustion chamber. This minimum capacity can be obtained by the provision of one tank or several tanks having a combined storage capacity which meets or exceeds the calculated volume. Preferably the storage tank, or combination of storage tanks, is positioned between the heat exchangers so as to receive heated working fluid from the first heat exchanger and provide heated working fluid to the second heat exchanger.

5 Claims, 1 Drawing Sheet

METHOD AND APPARATUS FOR UTILIZING WASTE HEAT IN A COMBUSTION SYSTEM

FIELD OF INVENTION

The invention relates to an improved method and system for collecting waste heat from a combustion chamber and utilizing the waste heat in the combustion process to optimize combustion efficiency by reducing heat loss to the atmosphere.

NATURE OF THE PRIOR ART

It has been long recognized that waste heat from a combustion cycle could be collected and returned to the heating chamber. The returned heat lessens the fuel requirement to achieve combustion and improves operating efficiency. Typically waste heat is collected through the use of a fluid system having heat exchangers in the exhaust stream of the furnace or other combustion device. Various oils or water are circulated through the heat exchanger and there acquire waste heat from the exhaust gases. The heated fluid is then pumped to a heat exchanger in the combustion chamber or in a gas stream entering the combustion chamber where heat is removed from it. Conventionally, there are one or more storage tanks in the system which permit accumulation of the transfer fluid. Also monitoring equipment and valves are often provided so that heated fluid is delivered to the combustion chamber at only those times when the temperature of the fluid exceeds the temperature of the combustion chamber and therefore is able to contribute heat to the combustion cycle.

In any combustion system the demand for heat in the combustion chamber is cyclical. The production of waste heat is also cyclical. These cycles can be measured and plotted over time. One problem which is common to prior art systems is that the time at which the most heat is required for the combustion cycle does not correspond to the time in which the most waste heat is available. Oftentimes, waste heat is available, but not needed. When that occurs the waste heat is usually lost to the atmosphere. To improve efficiency of a furnace one must reduce or eliminate the magnitude and frequency of these peaks and valleys. If waste heat is going to be used one can improve furnace efficiency by adjusting the fuel demand and waste heat availability cycles so that the times of peak fuel demand and peak waste heat correspond or are very close. However, many of the prior art systems are incapable of significantly altering the peaks and valleys of heat production of a combustion cycle and thus only minimally improve the efficiency of the combustion cycle. There is need for an apparatus and system in which the availability of waste heat matches the demand for heat in the combustion chamber. When availability and demand are matched, or are close to one another, the peaks and valleys encountered in a normal combustion chamber are reduced and efficiency is improved.

SUMMARY OF THE INVENTION

I prefer to provide an apparatus and system for utilizing waste heat in a combustion cycle which consists of a heat exchanger for removing heat from exhaust gases, at least one working fluid collection tank, pump and waste heat transformer for returning heat to the combustion cycle. In my system, as in most conventional heat recovery systems, I prefer to use water, oil or combination as the working fluid which flows at a constant rate in gallons per minute through the system. By monitoring the furnace, I determine the times in which the maximum amount of fuel is required for the combustion cycle and the times in which the maximum amount of waste heat is available from the combustion cycle. I have found in most systems that when these demands are plotted there will be a constant time difference between the peak times of fuel demand and peak times of waste heat availability. By multiplying the time difference by the flow rate of fluid through the system, I calculate a volume of fluid. Then I select one or more tanks large enough to hold that volume of fluid. I have found that when tank volume of that size is used in the waste heat recovery system, the fuel demand cycle and waste heat availability cycle for the combustion device will change. The peaks of both cycles will occur more closely in time and the magnitude of the peaks and valleys will decrease. This results in greater use of waste heat and a corresponding reduction in fuel demand. In this way, I can optimize combustion efficiency by minimizing heat loss to the atmosphere and providing more waste heat to the combustion chamber and reducing fuel demand at the time in which heat is required. As a result fuel is saved and combustion is improved.

BRIEF DESCRIPTION OF THE PREFERRED EMBODIMENTS

Figure 1:
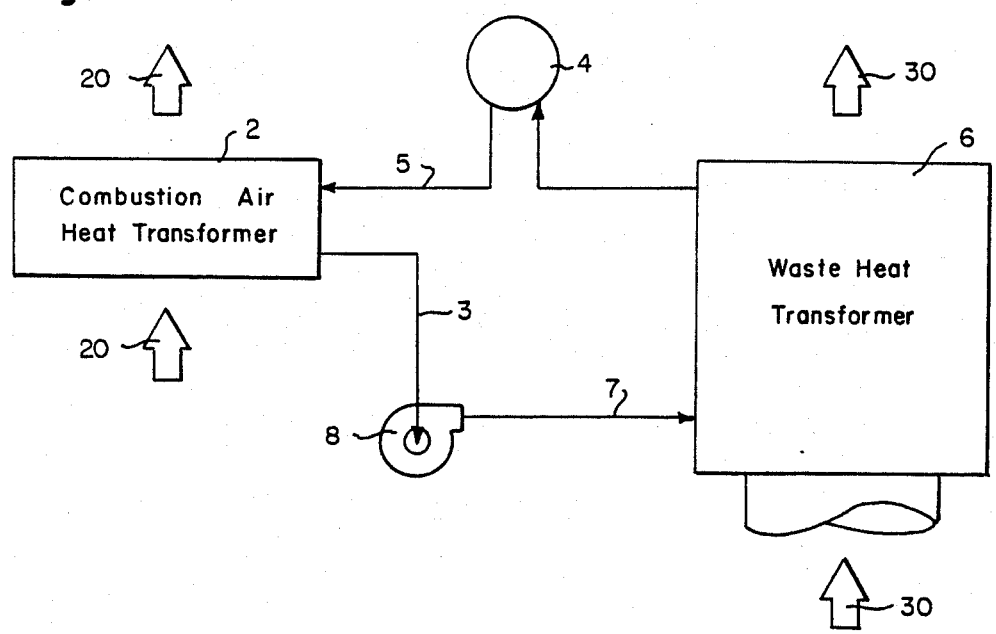
FIG. 1 is a schematic drawing of the closed loop liquid, heat recovery system in accordance with my invention.

Referring to the drawings, FIG. 1 shows a conventional closed loop liquid system, similar to conventional systems, which is improved in accordance with this invention by the provision of a fluid storage tank sized according to the present invention. In a conventional closed loop liquid system there is a combustion air heat transformer, or heat exchanger 2 located in the gas stream 20 which enters a combustion chamber. This heat exchanger 2 heats the gas stream 20 as it enters the combustion chamber. A working fluid flows into heat exchanger 2 through input 5 from one or more storage tanks 4 supplied by a waste heat transformer or heat exchanger 6 located in the exhaust gas stream indicated by arrows 30. Output 3 directs the fluid to a pump 8. The thermal fluid pump 8 pumps the working fluid at a constant rate through pipe 7 into a waste heat transformer 6. Hot gas, conventionally exhaust gas flowing from the combustion chamber, is passed through the waste heat transformer or exchanger and heats the working fluid. The heated fluid then goes to the combustion chamber where it heats the gas as it enters the combustion cycle.

Figure 2:
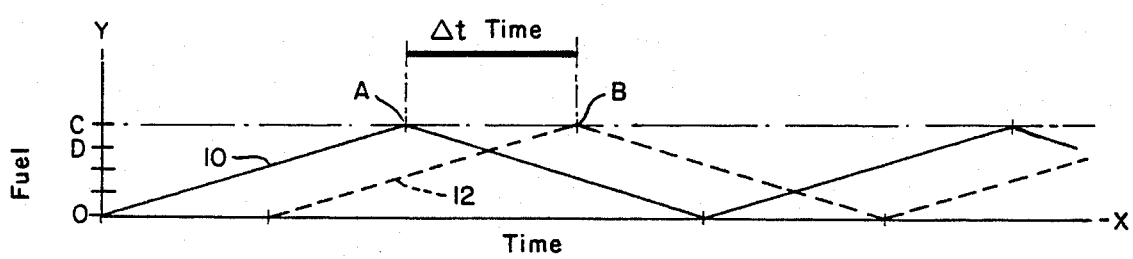
FIG. 2 is a graph showing the fuel requirement and waste heat produced in BTU's of a given furnace.

In industrial and large commercial furnaces there is a cyclical demand of fuel by the combustion chamber. This demand is shown by the graph of FIG. 2. There the amount of fuel required is plotted on the Y axis and time plotted on the X axis. Because similar graphs can be generated for nearly any furnace or combustion chamber, no values except for zero are shown on the graph. The solid line 10 indicates the fuel demand of the combustion device. Dotted line 12 indicates the waste heat available at the combustion air heat transformer 2. (See FIG. 1) Points A and B indicate the peak values of fuel requirements and waste heat availability, respectively. These peaks correspond to point C on the Y-axis. Both fuel requirements and waste heat availability is measured in BTU's. For any given heating chamber there will be a constant difference $\Delta t$ between the nearest set of peak values (points A and B) which can be easily calculated. The plots 10 and 12 on the graph in FIG. 2 can be determined by measuring the fuel requirements and waste heat from a particular furnace or other combustion device. Once these values have been determined and a graph similar to FIG. 2 is plotted, the time difference $\Delta t$ between points A and B is calculated.

In a closed loop system the fluid pump typically will operate at a constant rate providing a constant fluid flow in gallons per minute through the system I multiply this flow rate by the time difference between the peak fuel demand and the corresponding peak waste heat availability which gives a volume. Then I choose one tank or a combination of tanks whose volume is not smaller than the volume thus calculated. Hence, my formula for tank sizing is:

Fluid Flow (gals./minute) × (B − A) (minutes) =

Minimum Tank Volume (gals.)

I have discovered when one provides a storage tank or a combinaton of storage tanks in the waste heat recovery system and sizes that tank or combination of tanks according to this calculation, the combustion efficiency of the system can be greatly improved.

Figure 3:
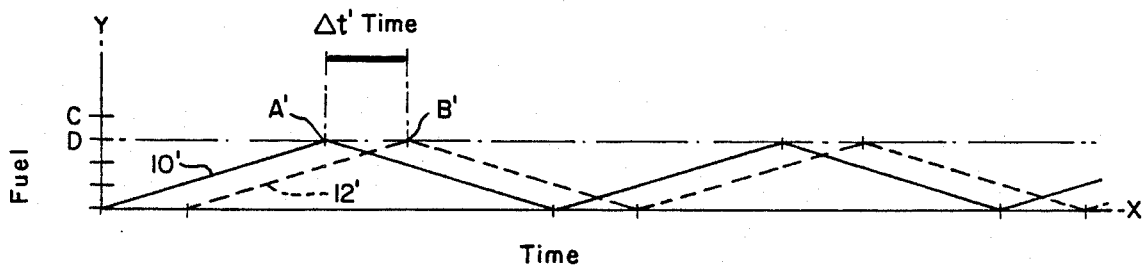
FIG. 3 is a graph showing the fuel requirement and waste heat produced after a start-up period in a furnace having my closed loop liquid, heat recovery system.

When one uses a storage tank having a capacity not smaller than that calculated according to my formula, or a combination of storage tanks whose combined volume meets that requirement, one reduces the time difference between points A and B in FIG. 2. These changes are shown by FIG. 3 in which curves 10' and 12' correspond to curves 10 and 12 respectively. As shown, the peaks A' and B' are now closer in time ($\Delta t'$) and lesser in magnitude. This lower magnitude is shown as point D on the Y-axis. As the time of maximum fuel requirement approaches the time of maximum waste heat availability, the efficiency of the heating system is improved. This improved efficiency translates into reduced demand for fuel and attendant savings.

EXAMPLE I

For a furnace used in steelmaking I had a working fluid pump which provided a fluid flow of 850 gallons per minute. The time between points A and B on FIG. 2 for that furnace was 5 minutes. Multiplying fluid flow times the time difference points A and B gives the minimum volume for tank to be used in that system which is 4,250 gallons. I then installed 2 tanks whose combined volume was 4,500 gallons. In that system, fuel demand was reduced and $2,500,000 was saved per year in reducing fuel costs.

I have observed that varying load conditions are present in most combustion systems. To further improve efficiency when varying load conditions are present, I have provided a tank, or a combination of tanks, with a volume larger than the minimum volume calculated to my equation. The additional capacity serves to accomodate varying load conditions in the combustion program. Again these varying load conditions can be determined by monitoring the furnace and determining fuel requirements and waste heat availability over time. There are practical limits to the amount of additional capacity one should provide. First, as tank size increases the cost of the tank also increases and more working fluid is required. Also, it takes time to heat the working fluid to its normal operating temperature. During this start up time there is little improvement in fuel efficiency. As one increases the tank volume the start-up time increases. The waste heat heat exchanger can also be positioned in a source of waste heat other than the exhaust gas flow from the combustion chamber of the furnace to which the working fluid circulating through waste heat exchanger flows.

While I have illustrated and described the present preferred embodiment of my invention and method for using the same, it is to be distinctly understood that the invention is not limited thereto, but may be otherwise variously embodied within the scope of the following claims.

I claim:

1. An improved heat recovery system for industrial and large commercial furnaces of the type in which there is a first heat exchanger positioned in a waste gas stream which transfers heat from the waste gas stream to a working fluid, a second heat exchanger which transfers heat from the working fluid to a combustion fluid stream flowing into a combustion chamber, piping connecting the first heat exchanger and the second heat exchanger and permitting flow of the working fluid from the first heat exchanger to the second heat exchanger, and back to the first heat exchanger, at least one storage tank and a pump connected between the first and second heat exchangers, said pump operating to provide a constant flow rate of working fluid wherein the improvement comprises providing a storage tank with a capacity not less than but substantially the same as that volume calculated by the flow rate of the working fluid multiplied by a time difference between a time at which the combustion chamber has a peak fuel requirement and a next subsequent time at which a maximum amount of waste heat is available to the combustion chamber.

2. The improved device of claim 1 wherein the first heat exchanger is positioned in the exhaust gas flow from the combustion chamber.

3. The improved device of claim 1 wherein the first heat exchanger is positioned in a source of waste heat other than the exhaust gas flow from the combustion chamber of the furnace to which the working fluid circulating through the first heat exchanger flows.

4. The system of claim 1 wherein the storage tank capacity is provided by a plurality of storage tanks.

5. An improved method for recovering waste heat in one of a industrial and large commercial furnace and utilizing the waste heat to improve combustion efficiency of the type wherein there is a first heat exchanger positioned in a waste gas stream which transfers heat from the waste gas stream to a working fluid, a second heat exchanger which transfers heat from the working fluid to a combustion fluid stream flowing into the combustion chamber, piping connecting the first heat exchanger and the second heat exchanger and permitting flow of the working fluid from the first heat exchanger to the second heat exchanger, and back to the first heat exchanger, at least one storage tank and a pump connected between the first and second heat exchangers, said pump operating to provide a constant flow rate of working fluid wherein the improvement comprises:
- (a) determining a time at which there is a peak fuel requirement in a combustion cycle;
- (b) determining a next subsequent time at which a maximum amount of waste heat is available; and
- (c) providing a total storage tank capacity of at least and substantially the same as a volume determined by the fluid flow rate of the pump multiplied by a time difference between a time at which peak fuel is required and a next subsequent time at which maximum amount of waste heat is available.

* * * * *